United States Patent [19]
Deumens et al.

[11] 3,856,819
[45] Dec. 24, 1974

[54] PROCESS FOR THE PREPARATION OF COUMARIN AND ALKYLATED DERIVATIVES THEREOF

[75] Inventors: Johannes J. M. Deumens, Limbricht; Egidius J. M. Verheijen; Jazef A. Thoma, both of Sittard, all of Netherlands

[73] Assignee: Stamicarbon B.V., Geleen, Netherlands

[22] Filed: June 22, 1973

[21] Appl. No.: 372,507

[30] Foreign Application Priority Data
June 22, 1972 Netherlands...................... 7208529

[52] U.S. Cl........................................... 260/343.2 R
[51] Int. Cl............................................... C07d 7/26
[58] Field of Search ............................ 260/343.2 R

[56] References Cited
UNITED STATES PATENTS
3,521,187   7/1970   Snavely et al.................... 260/343.2

Primary Examiner—John M. Ford
Attorney, Agent, or Firm—Cushman, Darby & Cushman

[57] ABSTRACT

Coumarin, a useful flavoring agent resembling vanilla beans, is produced by contacting dihydrocoumarin with a small quantity of a dehydrogenation catalyst such as palladium or platinum at elevated temperatures, optionally in the presence of oxygen. The alkylated dihydrocoumarin compounds may also be processed according to the disclosed procedure to produce the corresponding alkyl substituted products.

6 Claims, No Drawings

PROCESS FOR THE PREPARATION OF COUMARIN AND ALKYLATED DERIVATIVES THEREOF

BACKGROUND OF THE INVENTION

The present invention relates to an improved process for the preparation of coumarin and alkylated derivatives thereof, which are useful as flavorings and odorants.

As described in U.S. Pat. No. 3,442,910 in the name of Thweatt, these compounds can be prepared by the simultaneous cyclization and dehydrogenation of the lower alkyl esters of 2-oxocyclohexane propionic acid and its alkylated derivatives in the presence of a catalyst and at elevated temperatures. As the starting materials according to this known process, there are generally used cyclohexanone and cyclohexanone alkyl-substituted derivatives. The cyclization and dehydrogenation reactions occur simultaneously, converting the cyclohexanone derivatives to hydrocoumarin and coumarin.

According to this known process, however, there is a practical disadvantage in that the yield from the Thweatt process is only moderate while the life of the expensive catalyst used appears to be relatively short. The dehydrogenation of dihydrocoumarin, while following the teachings of Thweatt, has a yield of only 50 percent.

Dihydrocoumarin can also be dehydrogenated at lower temperatures by heating a mixture of liquid dihydrocoumarin and palladium (a minimum of 40 percent by weight of palladium) for 8 hours at 220° – 230°C (see Berichte 70, 1937, p. 237). The yield following this process is only 40 percent, while the cost for the large quantity of palladium catalyst required is excessively large.

DESCRIPTION OF THE INVENTION

The present invention provides a process for the preparation of alkylated or non-alkylated coumarin which avoids the above and other disadvantages by giving a considerably higher yield with correspondingly lower catalyst costs. Surprisingly, we have found that when the dehydrogenation process is carried out in the liquid phase at a temperature between about 200°–350°C in the presence of an amount of a metallic dehydrogenation catalyst from about 0.001–1 percent by weight of the metal in relation to the amount of starting material, the conversion and yield of coumarin and lower alkyl-substituted derivatives thereof is significantly greater while the amount of catalyst required is greatly reduced and catalyst life is prolonged.

The process according to the present invention is characterized in that a compound selected from the group consisting of dihydrocoumarin and alkylated derivatives of dihydrocoumarin conveniently represented by the formula:

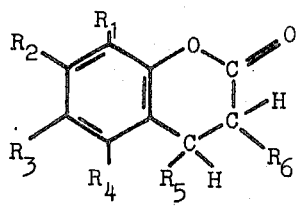

in which each of the $R_1$ through $R_6$ independently represents hydrogen or a lower alkyl group, provided that the total number of carbon atoms of the substituents $R_1$ through $R_6$ is at most 10, is contacted at about 200°–350°C with a metallic dehydrogenation catalyst in an amount of from 0.001–1 percent by weight calculated as metal based on the weight of the starting material and the dehydrogenation product coumarin or its lower alkyl-substituted derivative is recovered from the resulting reaction mixture.

Known metallic dehydrogenation catalysts are used according to the process of the present invention. Generally, however, for convenience and correct practice, such metallic catalyst contains a noble metal or nickel, preferred palladium, platinum, rhodium, or nickel, or a compound of these metals already known to be active as such a catalyst. Usually, the metallic catalysts are as used on a carrier such as silica gel, alumina, magnesia, and carbon, and mixtures of these or other carriers. Normally, the amount of the metallic catalyst is from about 0.5 – 20 percent by weight of the total weight of both catalyst and carrier. Preferably, the amount of catalyst is from about 0.01 – 0.3 percent by weight of the metal in relation to the starting material. The temperature may also be varied within the limits indicated above. The preferred temperature range is from about 240° – 300°C. It is within this temperature range that the optimum reaction rates, conversions, and yields are found. As the pressure is not a critical factor, it is preferable to have the reaction occur at atmospheric pressure, or at such elevated pressure as is required to maintain the liquid phase for the reaction.

The process can be practiced with an inert gas passing through the reaction mixture to ensure proper discharge of the free hydrogen formed in the dehydrogenation. Nitrogen and carbon dioxide are suitable inert gases for such service.

The conversion rate of the dihydrocoumarin or its alkyl-substituted derivatives in the dehydrogenation process of the invention is further increased considerably by the passage of oxygen or a gas containing oxygen through the reaction mixture.

The reaction mixture obtained from the dehydrogenation process, according to the invention, can be further treated. That is, the catalyst material may be precipitated and the reaction liquid discharged. The catalyst material may also be separated by filtration or by centrifuging. The recovered catalyst material may be reused. The distillation of the reaction liquid will separate the dehydrogenation product from any non-converted material. The non-converted material may then be recycled. The invention will be further illustrated by the following non-limiting examples thereof. Unless otherwise indicated, all parts and percentages are by weight.

EXAMPLE 1

Twenty g of 3,4-dihydrocoumarin and 100 mg of palladium-on-carbon catalyst (5 percent by weight of palladium) were introduced into a 100 ml flask provided with a stirrer, a gas inlet tube, and a reflux cooler.

The mixture was heated, while being continually stirred, within the range of about 265° – 275°C for 4 hours, with air being passed through the reaction mixture at the rate of 5 liters per hour. During the reaction, the liquid in the jacket of the reflux cooler was kept at 80°C.

0.5 g of ethyl benzene and 0.4 g of water were carried out through the cooler.

The reaction mixture was then filtered. The filtrate was dissolved in acetone and analyzed by gas chromatography. The filtered-off catalyst mass was reused in a second dehydrogenation run conducted with a second portion of 20 g of 3,4-dihydrocoumarin. A third and a fourth 20 g portion of 3,4-dihydrocoumarin were treated in the same manner. The filtrates obtained were analyzed gas-chromatographically. Besides about 0.4 g of ethyl benzene, each filtrate contained mainly coumarin product and unconverted 3,4-dihydrocoumarin starting material. The degrees of conversion to coumarin and the yields are given below:

| Portion Number | Conversion of 3,4-Dihydrocoumarin | Yield of Coumarin Based On Converted 3,4-dihydrocoumarin |
| --- | --- | --- |
| 1 | 70 % | 90 % |
| 2 | 60 % | 91 % |
| 3 | 57 % | 93 % |
| 4 | 51 % | 94 % |

EXAMPLE II

Example I was repeated, without air being passed through the reaction mixture. The figures for conversion to coumarin and yield were as follows:

| Portion Number | Conversion of 3,4-dihydrocoumarin | Yield of Coumarin Based on Converted 3,4-dihydrocoumarin |
| --- | --- | --- |
| 1 | 40 % | 92 % |
| 2 | 38 % | 92 % |
| 3 | 31 % | 93 % |
| 4 | 32 % | 94 % |

EXAMPLE III

Twenty g of 3,4-dihydrocoumarin and 500 mg of palladium-on-carbon (5 percent by weight of palladium) were introduced into a 100 ml flask provided with a stirrer, a gas inlet tube, and a reflux cooler. The procedures of Example I were then repeated, but without air being passed through the reaction mixture. The filtered-off catalyst was reused with eight successive 20 g portions of 3,4-dihydrocoumarin. The degree of conversion of 3,4-dihydrocoumarin averaged 55 percent and the yield 93 percent.

EXAMPLE IV

Twenty g of 3,4-dihydrocoumarin and 500 mg of platinum-on-carbon (5 percent by weight of platinum) were fed into a 100 ml flask provided with a stirrer and a reflux cooler, whereupon the mixture was heated at about 260° – 271°C for 4 hours and 15 minutes. The reflux cooler was cooled with water at 15° – 20°C. Upon cooling, the catalyst mass was filtered off and the filtrate was analyzed gas-chromatographically. The filtrate contained 650 mg of ethyl phenol, 100 mg of ethyl benzene, 12.9 g of 3,4-dihydrocoumarin and 5.8 g of coumarin.

The degree of conversion of 3,4-dihydrocoumarin was 35.5 percent and the yield was 83 percent.

EXAMPLE V

Example IV was repeated, but with a mixture of 20 g of 3,4-dihydrocoumarin and 1 g of rhodium-on-carbon (5 percent by weight of rhodium) heated at about 260° – 268°C for 4.5 hours.

3.8 g of coumarin were obtained, while 15.2 g of 3,4-dihydrocoumarin remain unconverted.

The degree of conversion of 3,4-dihydrocoumarin was 24 percent and the yield was 80 percent.

EXAMPLE VI

Example I was repeated, but with a mixture of 15 g of 6-methyl-3,4-dihydrocoumarin and 375 mg of palladium-on-carbon (5 percent by weight of palladium) heated at about 271° – 287°C for 4 hours.

9.9 g of 6-methylcoumarin were obtained, while 3.4 g of the starting material remained unconverted.

The degree of conversion of 6-methyl-3,4-dihydrocoumarin was 77 percent and the yield was 86 percent.

By the process of the foregoing examples, there may be obtained 7-methylcoumarin, 6-isopropylcoumarin, and 6-propyl-7-methylcoumarin with comparably improved degrees of conversion and yields.

What is claimed is:

1. The process for the preparation of a compound selected from the group consisting of coumarin and lower alkyl-substituted coumarin comprising heating a compound of the formula:

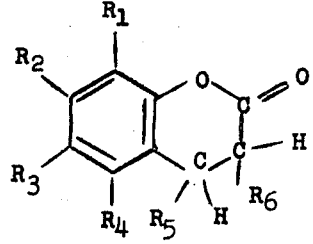

wherein each of $R_1$, $R_2$, $R_3$, $R_4$, $R_5$ and $R_6$ each independently represents hydrogen or a lower alkyl, provided that the total number of carbon atoms of the $R_1 - R_6$ substituents is at most 10 at a temperature in the range of about 200° – 350°C in the liquid phase and in the presence of a metallic dehydrogenation catalyst in an amount of 0.001–1.000 percent by weight calculated as metal based on the weight of the starting material to obtain a coumarin compound from the reaction mixture of the formula:

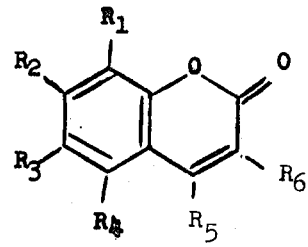

wherein each of $R_1$, $R_2$, $R_3$, $R_4$, $R_5$ and $R_6$ each independently represents hydrogen or a lower alkyl, provided that the total number of carbon atoms of the $R_1 - R_6$ substituents is at most 10.

2. The process according to claim 1, wherein 0.01 – 0.3 percent by weight of catalyst is used.

3. The process according to claim 1, wherein said temperature range is between about 240°C and 300°C.

4. The process according to claim 1 further including the step of passing oxygen or a gas containing oxygen through the reaction mixture during said dehydrogenation procedure.

5. The process according to claim 1, wherein the metal in said metallic catalyst is selected from the group consisting of palladium, platinum, rhodium and nickel, supported on an inert catalyst carrier material.

6. The process according to claim 1, wherein the reaction is conducted at atmospheric pressure.

* * * * *